United States Patent [19]

Gholson

[11] Patent Number: 4,494,115
[45] Date of Patent: Jan. 15, 1985

[54] CONTROLLER FOR A LOCKED CARRIER DISTRIBUTED MULTIPLEXED TELEMETRY SYSTEM

[75] Inventor: Norman H. Gholson, Long Beach, Miss.

[73] Assignee: The United States of America as represented by the Secretary of the Navy, Washington, D.C.

[21] Appl. No.: 283,418

[22] Filed: Jul. 15, 1981

[51] Int. Cl.³ .......................................... H04Q 11/04
[52] U.S. Cl. ......................... 340/825.65; 340/825.57; 340/825.62; 340/825.98; 340/825.52
[58] Field of Search ............... 340/825.57, 825.62, 340/825.65, 825.98, 825.52, 870.01, 870.11, 870.12, 870.13, 870.14

[56] References Cited

U.S. PATENT DOCUMENTS

| | | | |
|---|---|---|---|
| 3,021,508 | 2/1962 | White | 340/825.65 |
| 3,103,644 | 9/1963 | Burton . | |
| 3,423,733 | 1/1969 | Auer et al. | 340/825.65 |
| 3,540,030 | 11/1970 | Hartz | 340/825.65 |
| 3,544,957 | 12/1970 | Smetanin et al. . | |
| 3,618,001 | 11/1971 | Zill et al. . | |
| 3,706,086 | 12/1972 | Farnsworth . | |
| 3,946,362 | 3/1976 | Sumida et al. | 340/825.52 |
| 3,962,697 | 6/1976 | Vreeland . | |
| 4,155,075 | 5/1979 | Weckenmann et al. | 340/825.65 |
| 4,163,217 | 7/1979 | Wesemeyer et al. | 340/825.65 |

Primary Examiner—James J. Groody
Attorney, Agent, or Firm—R. F. Beers; F. I. Gray

[57] ABSTRACT

A controller for a locked carrier distributed multiplexed telemetry system which uses on-off switching of a d.c. power supply and a pilot signal generator at a remote control unit. A pilot signal from the remote control unit is amplified and rectified. The d.c. rectifier output, occurring only during the presence of the pilot signal, is sensed by a comparator which provides rapid transition pulses to advance a counter. The counter is advanced one count for each pilot signal cycle (on-off-on) and is reset for each d.c. power supply cycle (on-off-on). The devices to be controlled are connected to the output of the counter.

6 Claims, 3 Drawing Figures

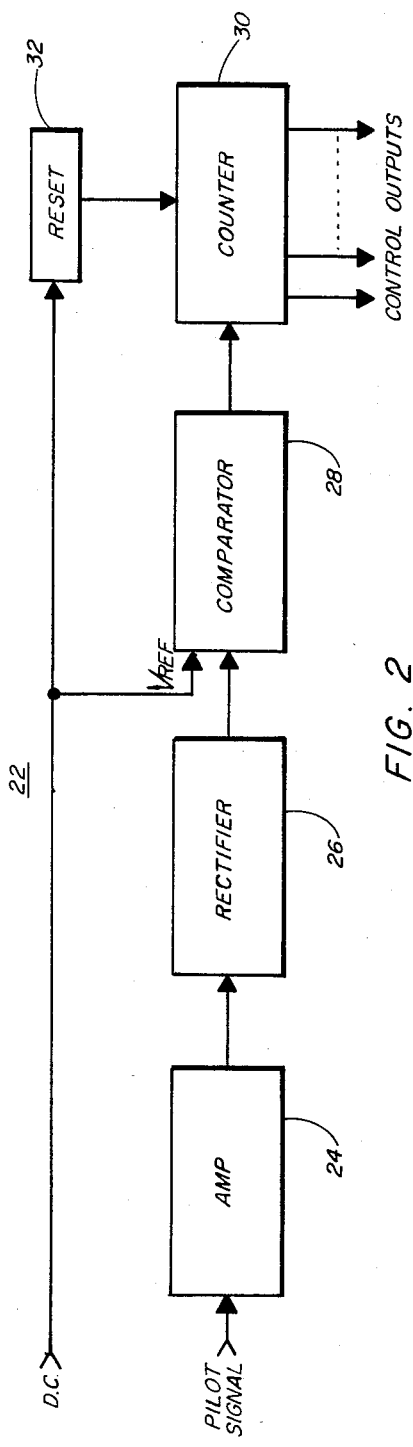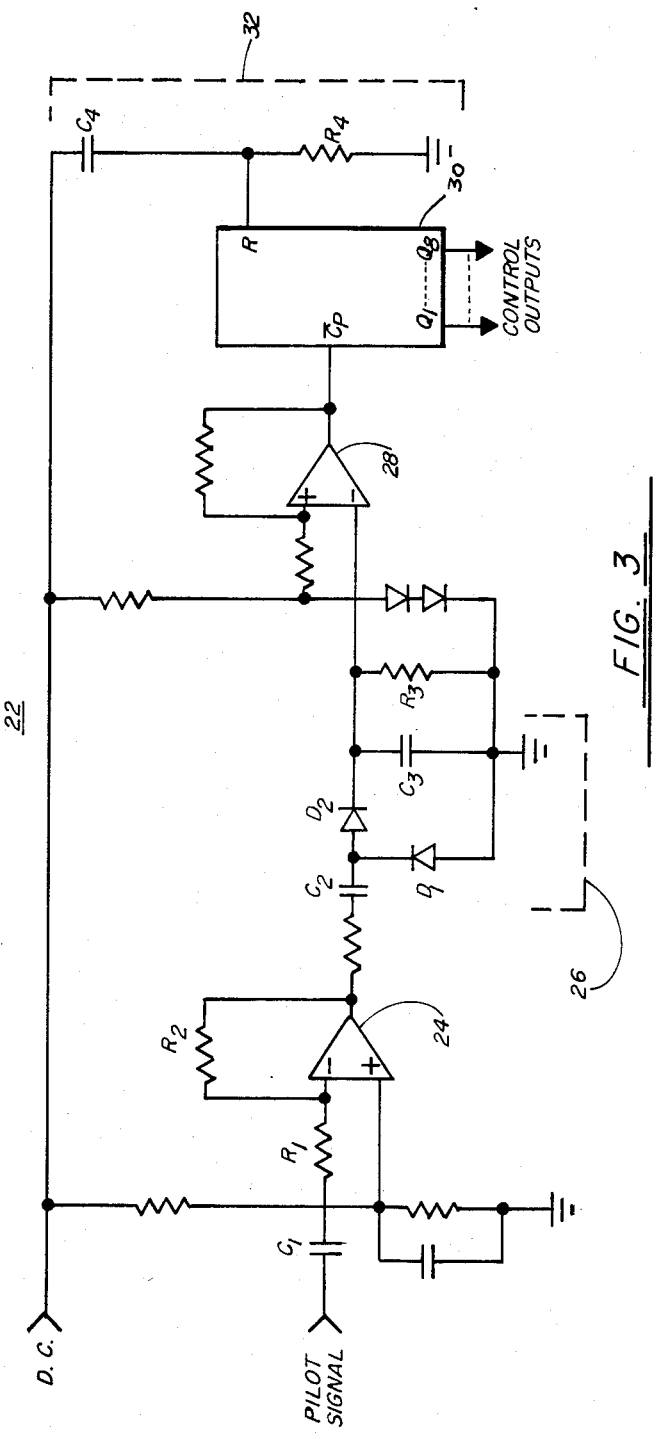

Patent 4,494,115

CONTROLLER FOR A LOCKED CARRIER DISTRIBUTED MULTIPLEXED TELEMETRY SYSTEM

BACKGROUND OF THE INVENTION

1. Field of the Invention

The present invention relates to the remote control of a telemetry system, and more particularly to a controller for a locked carrier distributed multiplexed telemetry system having a pilot signal which controller does not require additional conductors between a remote control unit and a plurality of multiplexer units.

2. Description of the Prior Art

For remote control of a plurality of multiplexer units the old control method involved shifting the phase of the frequency controlling pilot signal. A detector in each multiplexer unit detected the phase shifts and advanced a counter (positive phase shift) or reset the counter (negative phase shift). The counter's state was used to control the hardware of interest in the multiplexer unit. However, this method is inherently sensitive to noise, and this undesirable sensitivity causes the detectors to frequently interpret noise as commands other than those intended by the operator at the remote control unit.

SUMMARY OF THE INVENTION

Accordingly, the present invention provides a controller for a locked carrier distributed multiplexed telemetry system which uses on-off switching of a d.c. power supply and a pilot signal generator at a remote control unit. A pilot signal from the remote control unit is amplified and rectified. The d.c. rectifier output, occurring only during the presence of the pilot signal, is sensed by a comparator which provides rapid transition pulses to advance a counter. The counter is advanced one count for each pilot signal cycle (on-off-on) and is reset for each d.c. power supply cycle (on-off-on). The devices to be controlled are connected to the output of the counter.

Therefore, it is an object of the present invention to provide a controller for a locked carrier distributed multiplexed telemetry system which is insensitive to noise.

Another object of the present invention is to provide a controller which does not require additional conductors between the controller and a remote control unit.

Other objects, advantages and novel features will be apparent from the following detailed description when read in conjunction with the appended claims and attached drawing.

BRIEF DESCRIPTION OF THE DRAWING

FIG. 2 is a block diagram of the controller according to the present invention.

FIG. 3 is a schematic diagram of the controller of FIG. 2.

DESCRIPTION OF THE PREFERRED EMBODIMENT

Figure 1:
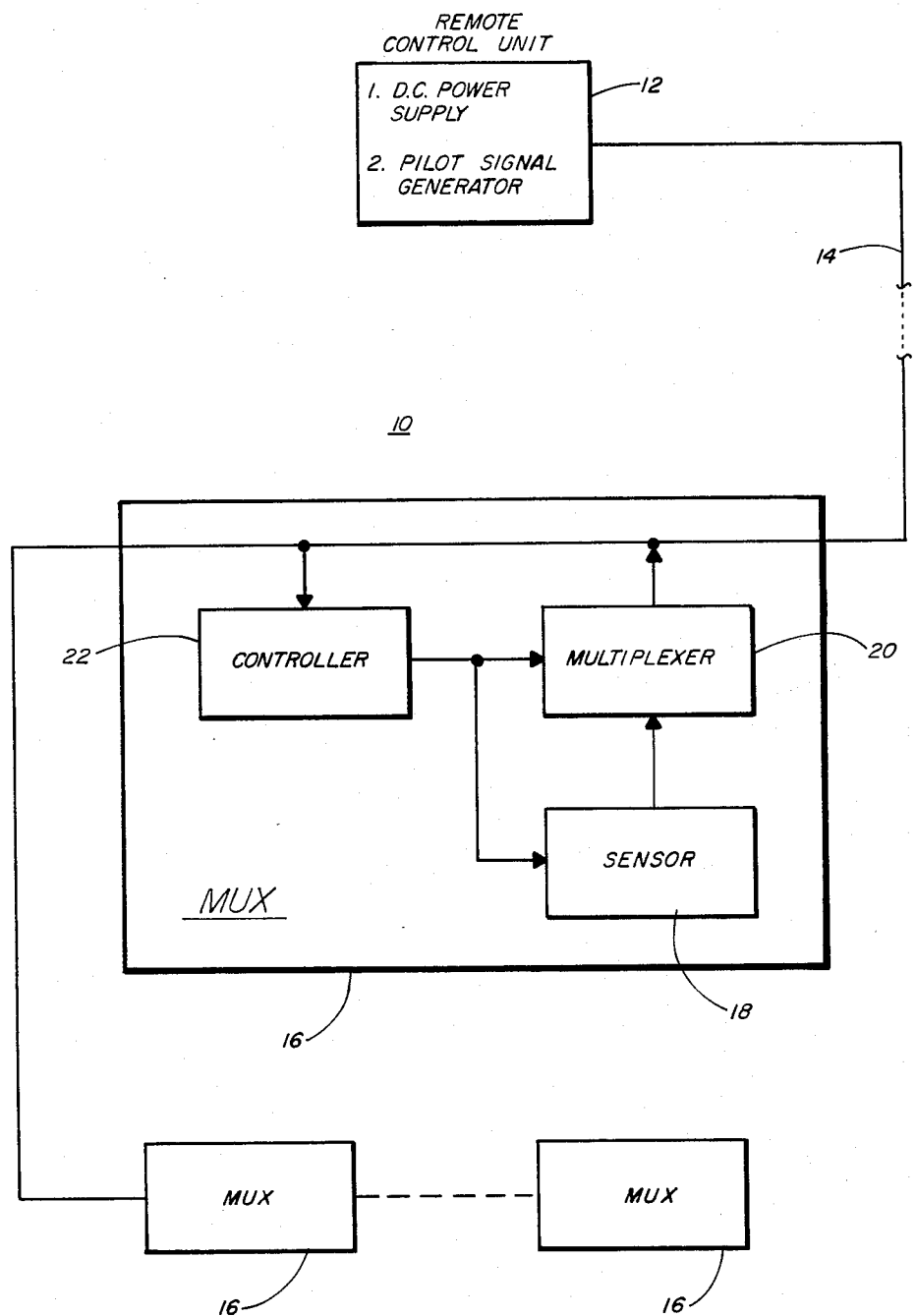
FIG. 1 is a block diagram of a locked carrier distributed multiplexed telemetry system having a controller according to the present invention.

Referring now to FIG. 1 a locked carrier distributed multiplexed telemetry system 10 is shown. A remote control unit 12 contains a d.c. power supply and a pilot signal generator. A long, two-conductor cable 14 connects the remote control unit 12 to a plurality of multiplexer units 16 connected in parallel. Each multiplexer unit 16 has at least one sensor or data source 18 which inputs data to a multiplexer 20 for transmission up the cable 14 to the remote control unit 12. A controller 22 receives commands from the remote control unit 12 via the cable 14 in the form of on-off-on cycles of the pilot signal generator and/or the d.c. power supply. The controller 22 in turn commands the sensor 18 and/or the multiplexer 20 or other hardware in the multiplexer unit 16 according to the command received.

As shown in FIGS. 2 and 3 the pilot signal enters the controller 22 via a coupling capacitor $C_1$ and is amplified by an amplifier 24. The gain of the amplifier 24 is controlled by the ratio of $R_2$, the feedback resistor, to $R_1$, the input resistor. The a.c. output of the amplifier 24 is coupled to a rectifier 26 which is a full wave rectifier formed by components $D_1, D_2, C_2$ and $C_3$. Components $R_3$ and $C_3$ determine the response time of the rectifier 26, and therefore the noise immunity of the controller 22. The output of the rectifier 26 is zero when the pilot signal is off and a non-zero d.c. voltage when the pilot signal is on.

A comparator 28 senses the d.c. output of the rectifier 26 and provides rapid transition pulses to advance a counter 30. The counter 30 is advanced one count by cycling the pilot signal on-off-on. A reset circuit 32 having components $C_4$ and $R_4$ resets the counter 30 by presenting a high input at the counter's reset terminal for a period of time after the d.c. power supply transitions from off to on. The particular counter 30 shown provides seven (7) outputs which allow 128 controller commands. Additional counters 30 may be installed in series if more commands are desired. The devices to be controlled attach directly to the control outputs of the counter 30.

In operation the gain of the amplifier 24 is set by $R_2$ and $R_1$ such that the a.c. output is a specified voltage peak-to-peak, such as 7 volts. $R_3$ and $C_3$ are set to determine the rectifier 26 response time, for example 5 seconds. Likewise the reset circuit 32 components $R_4$ and $C_4$ are set to hold the reset terminal of the counter 30 true for a period of time, such as 5 seconds, after the d.c. power supply is turned on. Normally the d.c. power supply and pilot signal are on. For these time values the pilot signal is switched off for ten seconds, and then switched on, advancing the counter 30 by one count. To reset the counter 30 the d.c power supply is switched off for 10 seconds, then switched on.

Thus, the present invention provides a controller for a locked carrier distributed multiplexed telemetry system which features noise immunity superior to that of the older device, i.e., a false command rate approximately 1% of the old device, using a technique which makes the controller insensitive to noise spikes of less than 1 second duration. Additionally, the controller is sensitive to noise only during the period of time control commands are being issued.

What is claimed is:

1. A controller for a locked carrier distributed multiplexed telemetry system comprising:
   means for detecting the presence of a pilot signal;
   means for counting each time said pilot signal cycles from off to on, a particular command to be executed being determined by the count of said counting means; and means for resetting said counting means when a d.c. power supply input is cycled from off to on.

2. A controller as recited in claim 1 wherein said detecting means comprises:
   a rectifier to convert said pilot signal to a non-zero d.c. voltage when said pilot signal is on; and
   means for sensing said non-zero d.c. voltage to provide a pulse output to said counting means.

3. A controller as recited in claim 2 wherein said detecting means further comprises means for amplifying said pilot signal prior to inputting to said rectifier.

4. A controller as recited in claim 3 wherein said counting means comprises a command counter, the count of which is advanced by each pulse output from said sensing means and which is reset to zero by said resetting means.

5. A controller as recited in claim 4 wherein said resetting means comprises an R.C. circuit connected to said command counter such that when said d.c. power supply input is cycled from off to on the count of said command counter is reset to zero.

6. A controller as recited in claim 5 wherein said sensing means comprises a comparator which provides said pulse output to said command counter when the output of said rectifier is said non-zero voltage.

* * * * *